United States Patent Office 3,509,195
Patented Apr. 28, 1970

3,509,195
POLYMERIC 1,3 - BIS(SILYL) - 1,3 - DIAZA - 2 - SILA-CYCLOALKANES AND PROCESS FOR MAKING
Walter Fink, Zurich, Switzerland, assignor to Monsanto Company, St. Louis, Mo., a corporation of Delaware
No Drawing. Filed Aug. 5, 1966, Ser. No. 570,429
Claims priority, application Switzerland, Aug. 20, 1965, 11,844; July 15, 1966, 10,390
Int. Cl. C07d *103/02*
U.S. Cl. 260—448.2
10 Claims

ABSTRACT OF THE DISCLOSURE

Compounds of the formula

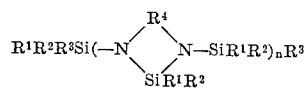

wherein $n$ is 2 to 10 made by reacting a compound of the formula

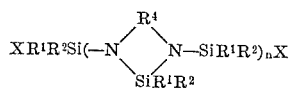

wherein X is Cl, Br, an amino group or residue of amine, with a compound of the formula $MR^3$ where M is an alkali metal or H, provided M is H when X is amino or residue of an amine. These compounds find utility as heat transferring liquids, lubricants, antifoamants, antioxidants, stabilizers, accelerators in vulcanization, plasticizers, hydrophobic agents and absorbers for neutrons.

---

The present invention relates novel oligomeric 1,3-disilyl-1,3,2-diazasilacycloalkanes and to a process for preparing 1,3-disilyl-1,3,2-diazasilacycloalkanes of the general formula (I)

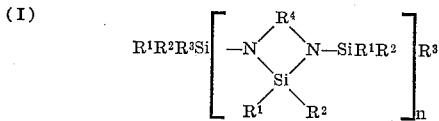

in which $R^1$, $R^2$ and $R^3$, when taken singly, represent identical or different, possibly substituted and/or ethylenically or acetylenically unsaturated hydrocarbon groups, heterocyclic groups or silyl groups, which can also be attached through an oxygen atom and the silyl groups can also be attached through a nitrogen atom, $R^1$ and $R^2$ can also be hydrogen atoms or fluorine atoms, $R^1$ and $R^2$, when taken together with their silicon atom form a possibly substituted heterocyclic ring, $R^4$ is a possibly substituted and/or ethylenically or acetylenically unsaturated bivalent hydrocarbon group, heterocyclic group, an ether group attached through a carbon atom or a corresponding group, which possess S, SS, NH, NR'' (R''=organic group occurring in such groups), $SiR^1R^2$, $NSiR^1R^2R^3$, SO or $SO_2$ in the place of the ether oxygen atom, which has attached the two nitrogen atoms of the diazasilacycloalkane ring in 1,2- or 1,3-position, or ortho- or peri-position, and $n$ stands for an integer of 1 to 10. Normally the R groups have not more than 24 carbon atoms, usually not more than 8 carbon atoms.

The compounds I are obtained by reacting a 1,3-disilyl-1,3,2-diazasilacycloalkane of the general formula (II)

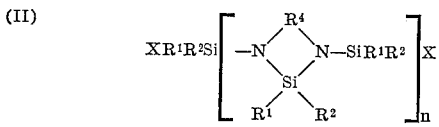

in which $R^1$, $R^2$, $R^4$ and $n$ are defined in column 1 and X represents a chlorine atom, bromine atom, a $H_2N$ group or a corresponding group derived from a primary or secondary amine, which is more volatile than the hydroxyl compound or the aminosilane compound to be reacted with it, with a compound of the general formula (III)     $MR^3$ in which $R^3$ is defined as before and M represents an alkali metal atom or possibly a hydrogen atom attached to an oxygen atom or nitrogen atom, in an inert solvent, until substantially no more alkali halides, or ammonia or amine are formed.

Some diazasilacycloalkane derivatives, which have on the ring nitrogen atoms hydrocarbon groups, have been known previously. Different than these compounds the diazasilacycloalkane derivatives of invention each possess on the two nitrogen atoms of the ring a group attached through a silicon atom. Such completely silylated diazasilacycloalkane rings are hydrolytically and thermally more stable and have, as a rule, lower melting points and at the same time higher boiling points, so the liquid range is greater.

As representatives of the type of the disclosed class of compounds as they are shown in page 1, only those with $n=1$, that is 1,3-bis-trimethylsilyl-2,2-dimethyl-1,3,2-diazasilacyclopentane, 1,3 - bis - trimethylsilyl-2-methyl-2-chloro-1,3,2-diazasilacyclopentane, 1,3-bis-trimethylsilyl-2,2-dichloro-1,3,2-diazasilacyclopentane and 1,3-bis-dimethylchlorosilyl - 2,2 - dimethyl - 1,3,2 - diazasilacyclopentane [(D. Kummer and E. G. Rochow, Z. anorg. allg. Chem. 321, 21 (1963); F. A. Henglein and K. Lienhard, Makromol. Chem. 32, 218 (1959); C. H. Yoder and J. J. Zuckermann, Inorg. Chem. 4, 116 (1965)] and 1,3-bis-trimethylsilyl - 2 - methyl - 2 - hydrogeno - 1,3,2 - diazasilabenzocyclopentane [D. Kummer and E. G. Rochow, Angew. Chem. 75, 207 (1963)] have been previously known.

According to the indicated references the diazasilacyclopentane derivatives have been prepared by reaction of the di-lithium salt of the N,N'-bis-trimethylsilyl-ethylenediamine with trimethylchlorosilane, dimethyldichlorosilane or methyltrichlorosilane. In the last named reaction there are formed mainly polymeric products, which possess no uniform structure. The diazasilabenzocyclopentane derivative has been prepared from N,N'-bis-trimethylsilyl-o-phenylenediamine and methylhydrogenodichlorosilane. The phenylhalosilanes cannot be reacted in this manner because of their slowness in reaction.

The process of the present invention uses easily available starting compounds and allows preparation of compounds, which contain in the exocyclic silyl groups different organic groups, especially hydrocarbon groups, heterocyclic groups, silyl groups and siloxanyl groups attached through an oxygen atom, or corresponding groups, which are attached through a carbon atom or silicon atom. Also it is, different than previously known processes, possible to prepare oligomeric compounds. Under the term "oligomeric compounds" there is understood diazasilacycloalkane derivatives, corresponding to the formula set forth at the beginning and which contain 2 to 10 ring units, that is by which the symbol $n$ stands for an integer of 2 to 10. Such oligomers with ring units which repeat up to 10 times, are especially suitable for the purposes mentioned below, because they may have very high boiling points and nevertheless low melting points. Known silicons which differ very substantially from the products of invention because the four-numbered rings containing nitrogen atoms are missing, are hydrolytically and especially thermally much less stable.

The starting Compounds II may be prepared according to a novel process described in copending application Ser. No. 563,693, filed July 8, 1966. With regard to their preparation it was known that one obtains from e.g. ethylene diamine and dimethyldichlorosilane in a molar proportion of 1:1 in benzene solution at low temperatures the corresponding 1,3-bis-(dimethylsilyl) - 2,2 - dimethyl - 1,3-diaza-2-sila-cyclopentane in 60% yield and in addition 15.6% of polymeric residue. It was also known that a linear polymer with the supposed structure.

[—Si(CH₃)₂NHCH₂CH₂NH—]

is formed from the same reaction components in a molar proportion of 2:1 under the same conditions. [E. G. Rochow, Mh. Chem. 95, 750 (759) (1964).]

This linear polymer is unstable and cleaves off ethylene diamine even at room temperature and faster at 400° C. in vacuum, whereby a further condensation occurs. A substantial quantity of the first named monomer is formed as by-product in this preparation. With these hitherto known processes it is not possible to prepare defined uniform products, especially short-chain products in which, according to Formula I, the symbol $n$ stands for an integer of 2 to 10.

It has now been found that one obtains the Compounds I when a diamine of the general formula (IV)          $H_2N—R^4—NH_2$ in which $R^4$ is defined as before, and a halosilane of the general formula (V)          $R^1R^2SiX_2$ in which $R^1$, $R^2$ and X are defined as before, are reacted first in a molar proportion insufficient with respect to the halosilane and preferably 1:05, in an inert solvent, if necessary by applying pressure, at a temperature lying below 100° C., e.g. at 25° C., the reaction mixture is subsequently heated at a higher temperature than that employed first, e.g. 60° to 130° C., for some time, e.g. at least about 10 minutes, then the missing quantity of halosilane which is theoretically necessary to reach the desired grade of oligomerization is added to the solution which may be cooled during the addition and then heated possibly without a solvent, at least at the last employed temperature, e.g. 60° to 250° C., in order to complete the reaction.

On reacting the reaction partners II and III there are two different cases to distinguish, namely the halogen exchange process and the amino exchange process.

In the halogen exchange process the starting Compound II contains two exchangeable halogen atoms. As a rule, these are chlorine atoms or bromine atoms. Iodine atoms are seldom used and fluorine atoms generally are not at all or only very difficultly exchangeable. The simplest organic representative is 1,3-bis(dimethylchlorosilyl)-2,2-dimethyl-1,3-diazasilacyclopentane.

As reaction partner an organic alkali metal compound is utilized. Such alkali metal compounds are known. Simplest examples are LiPh, KOMe, NaOPh, NaSiMe₃, KSiPh₃, KOSiMe₃ and NaOSiPh₃ (Me, Ph=methyl, phenyl). They contain attached to a sodium atom, potassium atom or lithium atom an organic group or a silyl group, some of which have been cited for the definition of $R^3$. According to the present process preferably groups of an alcohol, phenol or silanol are introduced into the starting Compounds II. These reactions are in principle known and the usual working methods may also be applied for the process of invention. Organomagnesiumhalides (Grignard compounds) can, however, not be utilized for the introduction of the organic groups, because the Si—N bonds are thereby split. Summarizing it simply, the reaction components are heated in an inert solvent, until the separation of the alkali halide is complete.

The starting Compounds II having two secondary amino groups are obtained by exchanging the halogen atoms for secondary amino groups. These reactions are, in principle, also known and the customary working methods can also be applied for practicing the invention. Summarizing it simply, a 1,3-bis-chlorosilyl-1,3,2-diazasilane of the corresponding Formula II (X=Cl, Br) is reacted with a quantity of a secondary amine which is at least sufficient for the replacement of the halogen and the binding of the hydrogen halide, possibly in an inert solvent, and, if necessary, heated, until the separation of the aminochlorohydrates is complete. The reaction of slightly basic amines can suitably also be achieved in the presence of a stronger basic tertiary amine such as e.g triethylamine. In the products II so obtained X represents preferably a secondary amino group attached through its nitrogen atom. The simplest purely organic representative is 1,3-bis-(dimethyldimethylaminosilyl) - 2,2 - dimethyl - 1,3,2-diazasilacyclopentane. The reaction with ammonia or primary amines is, in principle, also possible. It leads, however, easily to side reactions.

The preparation of the Compound II, in which X represents the residue of an easily volatile amine attached through its nitrogen atom and its incorporation into the desired end product, may also be combined, that is the intermediate product II does not have to be isolated. For the preparation of the end products and the same solvents as for the preparation of the starting products can be utilized.

The amino exchange process may preferably be carried out with the starting compounds, whose amino groups are derived from an easily volatile secondary amine like dimethylamine or diethylamine. In any case it is desirable that the separated amines have a lower boiling point than the hydroxyl compounds, amino compounds and aminosilane compounds to be reacted. In order to obtain the amino exchange it is sufficient to heat the reaction components, possibly in an inert solvent until the separation of the amine is complete.

On the reaction of aminosilane compounds preferably those are used, which contain on the nitrogen atom besides the silyl group also a hydrocarbon group such as $HN(Me)SiR^*_3$ and $HN(Ph)SiR^*_3$.

Even though the choice of the substituted groups $R_1$ and $R_2$ which are introduced by the halosilane V is subjected to certain restrictions because of difficulties in the preparation of the starting Compounds II having X=Cl or Br, many more different kinds of substituents can be present in the group $R^3$, which is introduced subsequently by halogen exchange or amine exchange.

Besides the substituents which have already been mentioned for $R^1$ and $R^2$, the following additional ones should also be considered:

—COR″, —CSR″, —COOR″, —COSR″,
—CSSR″, —OCOR″, SCOR″, —SCSR″,
—CONR″₂, —N(R″)COR″, —N(R″)COOR″,
—N(R)CONR″₂, —NR″₂, —N=NR″, =NR″,
—N=NCR″₂ —SOR″, —SO₂R″, —SO₂R″,
—SO₂NR″₂, —N(R″)SO₂R″ and —N(R″)SO₂OR″

(R″ is defined as before).

Examples for some acyl substituents which have the general formula —COR″, are: acetyl, n-propionyl, isopropionyl, acrylyl, crotonyl, propiolyl, n-butyryl, isobutyryl, valeryl, pivalyl, enanthyl, caprylyl, lauroyl, myristoyl, oleoyl, stearoyl, phenylacetyl, diphenylactyl, cinnamoyl, benzoyl, naphthol, cumoyl, 4-bi-phenylylcarbonyl, anisoyl, phenetoyl, veratroyl, 2,3,4-, 1,4,5- and 3,4,5-trimethoxybenzoyl, p-diphenylamino-benzoyl, cynacetyl, trimethylsilylanthranoyl, methoxyacetal, dimethylaminoacetyl, trimethylsilylaminoacetyl, bis(triphenylsilyl)aminoacetyl, trimethylsiloxyacetyl, trichloroacetyl, trifluoroacetyl, 2-furoyl, 3-furoyl, pyrroyl, including the thio analogues which correspond to the general formula —CSR″.

Examples for sulfinyl substitutents and sulfonyl substituents are those groups which have a —SO or —SO₂ group instead of the —CO group shown in the above mentioned formula and therefore correspond to the general formulae —SOR″ and —SO₂R″. They may, as also the carbonyl groups, appear repeatedly in the same hydrocarbon group.

Examples for some ester substituents, which have the general formula —COOR″, are: carbomethoxy, carbethoxy, carbovinyloxy, carbo-n-propoxy, carbo-2-propenoxy, carbo-iso-propenoxy, carboctoxy, carbundecyloxy, carboctadecoxy, carbophenoxy, including the thio analogues which correspond to the general formula —COSR″, —CSOR″ and —CSSR″.

Examples for related sulfonic acid ester substituents are those groups which have a —SO₂═group instead of the —CO— group shown in the above mentioned formula and therefore correspond to the general formula —SO₂OR″.

The enumerated carboxylic acid groups and sulfonic acid ester groups can also be attached through a nitrogen atom and represent thus in the first case an urethane group which corresponds to the general formula —N(R″)COOR″. Included are the analogous groups of thio urethanes. In the second case they represent a sulfamide group and may, therefore, be expressed by the general formula —N(R″)SO₂OR″.

Examples for another class of ester substituents which correspond to the general formula —OCOR″, are: acetoxy, acryloyloxy, n-propionyloxy, crotonyloxy, propionyloxy, tetroloxy, n-butyryloxy, valeryloxy, caproyloxy, caprylyloxy, pelargonyloxy, phenylacryloxy, benzoxy, capryloxy, lauroyloxy, palmitoyloxy, cumyloxy, phenylacetoxy, including the thio analogues which have the general formulae —SCOR″, —OCSR″ and —SCSR′.

The esters of dicarboxylic acids, such as e.g. the ethyl ester of the oxalic acid, malonic acid, succinic acid, maleic acid, fumaric acid, adipic acid, phthalic acid etc., can also be present as substituents.

Examples for another class of ester substituents are those groups which possess an —SO₂ group instead of the —SO group shown in the above mentioned formula and therefore correspond to the general formula —OSO₂R″.

Examples for some carbamyl substituents which have the general formula —CONR″, are: the unsubstituted carbamyl group and organic substituted carbamyl groups such as methylcarbamyl, ethylcarbamyl, allylcarbamyl, n-propylcarbamyl, iso-propylcarbamyl, iso-propenylcarbamyl, n-butylcarbamyl, sec-butylcarbamyl, 3-n-butenylcarbamyl, myristylcarbamyl, cyclohexylcarbamyl, phenylcarbamyl, trimethylsilylcarbamyl, dimethyl-phenylsilylcarbamyl, triphenylsilylcarbamyl, including the disubstituted carbamyl groups.

Examples for some tertiary amino groups are: dimethylamino, diethylamino di-n-propylamino, di-iso-propylamino, diallylamino, di-n-butylamino, di-iso-butylamino, di-tert-butylamino, di-3-butenylamino, di-2-butenylamino, di-n-amylamino, di-iso-octylamino, didodecylamino, dicyclohexylamino, dicyclohexenylamino, dibenzylamino, diphenylamino, ditolylamino, bis(biphenyl)amino, bis (p-methoxyphenyl)amino, bis(m-phenoxyphenyl)amino, bis(m - trifluoromethylphenyl)amino, N,N,N′-triphenylbenzidino, pyrrolino, pyrrolidino, pyrazolino, piperidino, morpholino, thiazino, N-trimethylsilylpiperazino, tetrahydroquinolino, decahydroquinolino.

Examples for some amido substituents which have the general formula —N(R″)COR″, are: acetamido, chloroacetamido, trifluoroacetamido, benzamido, cyanobenzamido, iso - propionylamido, n - butyrylamido, valerylamido, palmitoylamido, tetracosanoylamido, napthaoylamido, including the related imido substituents such as phthalimido, pyromellitimido etc.

Examples for sulfonamido substituents are those groups which possess a —SO₂═group instead of the —CO═ group shown in the above mentioned formula and therefore correspond to the general formula —N(R″)SO₂R″.

Examples for some azo substituents which possess the general formula —N═NR″, are: methylazo, ethylazo, n-butylazo, iso-butylazo, tert-butylazo, phenylazo, N-phenyl-phenylene-bis-azo.

Examples for some azino substituents which possess the general formula ═N—N═CR″R″, are: acetaldehydazino, acetonazino, hexafluoroacetonazino, benzaldehydazino, acetophenonazino, 2,4′-dichloroacetophenonazino, benzophenonazino, 4,4′-bis(N-trimethylsilyl-methylamino)-benzophenonazino.

Examples for some alkylidenamino substituents, which possess the general formula —N═CR″R″, are: methylenamino, ethqyidenamino, 2-trifluoroethylidenamino, vinylidenamino, n-propylidenamino, 1-ethylbutylidenamino, 3-butenylidenamino, benzylidenamino, alpha - methylbenzylidenamino, alpha-phenylbenzylidenamino, cinnamylidenamino.

Examples for some imino substituents, which possess the general formula ═NR″, are: the organic substituted imino groups such as methylimino, iso-butylimino, sec-butylimino, allylimino, cycloheptylimino, phenylethylimino, anisylimino, p-dimethylaminophenylenimino, pentafluorophenylimino etc.

The products of the process of the invention are liquid to solid depending on the substituents present and their distribution on the 1,3 - diazo-2 - sila - cycloalkane ring. Methyl groups, long-chain aliphatic groups ($C_{10}$ to $C_{14}$) and ether groupings generally decrease the melting point, especially with unsymmetrical substituents on the silicon atoms.

The products may be utilized as heat transferring liquids at high temperatures, lubricants for thermally highly stressed parts of machines, hydraulic fluids, agents for textile, anti-foamants, anti-oxidants, stabilizers, accelerators in vulcanization, plasticizers, hydrophobic agents, absorbers for neutrons etc.

The products with unsaturated substituents on the silicon atoms are valuable intermediate products, because they can be subjected in a manner known in the art to addition reactions and polymerization reactions.

EXAMPLE 1

To 120.1 g. (2 moles) of ethylene diamine dissolved in 1000 ml. of benzene are added dropwise at room temperature 129 g. (1 mole) of dimethyldichlorosilane. Then the mixture is refluxed for one hour, cooled, an additional 85.1 g. (0.66 mole) of dimethyldichlorosilane are added at once and the reaction mixture refluxed for another hour. After having filtered off the chlorohydrates the benzene is distilled off under reduced pressure and the residue is fractionally distilled under vacuum.

One obtains four fractions:

(A) 19.9 g. 1,3-bis(dimethylchlorosilyl) - 2,2 - dimethyl-1,3-diaza-2-sila-cyclopentane; B.P. 87–90° C./0.1 mm.
(B) 46.4 g. dimeric product; B.P. 148–150° C./0.05 mm., colorless mobile oil, $n_D^{20}$ 1.4819.

*Analysis.*—Calc'd for $C_{14}H_{38}N_4Si_5Cl_2$ (percent): C, 35.49; H, 8.08; N, 11.82; Cl, 14.96; mol. weight 473.85. Found (percent): C, 35.94; H, 7.93; N, 11.62; Cl, 14.40; mol. weight 452 (benzene).

(C) 18.0 g. trimeric product; B.P. 225–227° C./0.1 mm., slightly yellow, mobile oil, $n_D^{20}$ 1.4878.

*Analysis.*—Calc'd for $C_{20}H_{54}N_6Si_7Cl_2$ (percent): C, 37.17; H, 8.42; N, 13.00; Cl, 10.97; mol. weight 646.24. Found (percent): C, 37.07; H, 8.14; N, 13.05; Cl, 1071; mol. weight 690 (benzene).

(D) 3.3 g. tetrameric product; B.P. 277–281° C./0.05 mm., yellow viscous oil, $n_D^{20}$ 1.4910.

*Analysis.*—Calc'd for $C_{26}H_{70}N_8Si_9Cl_2$ (percent): C, 38.15; H, 8.62; N, 13.69; Cl, 8.66; mol. weight 818.6. Found (percent): C, 38.27; H, 8.36; N, 13.49; Cl, 8.76; mol. weight 798.

In the following table the distribution of the monomer and oligomers is shown in percent. The molar proportions of ethylenediamine and dimethyldichlorosilane have been varied. The same procedure as described in Example 1 has been used. After the benzene has been completely removed, the residue is calculated as being 100%. The missing quantity to give a 100% yield after the fractionation is due to higher oligomers having $n=6$ and greater. By decreasing the amount of dimethyldichlorosilane with respect to ethylenediamine the amount of higher oligomers increases as is evident from the table. The higher oligomers undergo further condensation upon distillation. A partial separation is possible by e.g. fractional precipitation.

| Ethylenediamine/di-methyldichlorosilane (molar ratio) | 1,3-bis-dimethylchlorosilyl-2,2-dimethyl-1,3,2-diazasilacyclopentane (percent yield) [1] | | | | |
|---|---|---|---|---|---|
| | $n=1$ | $n=2$ | $n=3$ | $n=4$ | $n=5$ |
| 1:1 | 77.0 | 21.7 | | | |
| 1:0.833 | 19.9 | 46.4 | 18.0 | 3.3 | |
| 1:0.777 | 11.3 | 28.1 | 28.1 | 10.8 | 2.5 |
| 1:0.750 | 10.8 | 19.8 | 23.8 | 34.2 | 8.6 |
| 1:0.733 | 3.4 | 8.5 | 15.3 | 25.7 | 29.2 |

[1] Average values of 2 assays.

In order to get as much as possible of the monomer ($n=1$) it is expedient to use an excess of the halosilane, e.g. a molar ratio of 1:2.

(E) Pentameric product; B.P. 304–308° C./0.06 mm., brown wax-like substance which crystallizes partially.

*Analysis.*—Calc'd for $C_{32}H_{86}N_{10}Si_{11}Cl_2$ (percent): C, 38.87; H, 8.75; N, 14.13; mol. weight 991.0. Found (percent): C, 37.27; H, 8.52; N, 14.39; mol. weight 965.

EXAMPLE 2

In the starting compounds obtained as described in Example 1, butyl groups are substituted for the chlorine atoms, as described below.

The compounds are dissolved in 50 ml. of hexane and the calculated quantity of butyllithium (2 n-solution in hexane) added dropwise with stirring. One refluxes for 1 hour and the separated lithium chloride is removed together with the solvent. The purification of the end-products is effected by fractional distillation.

(F) From 22.6 g. (0.075 mole) of starting compound A and 75 ml. solution of butyllithium (0.15 mole) one obtains 18.6 g. (71.9%) of butylated endproduct; B.P. 108–109° C./0.03 mm.; $n_D^{20}$ 1.4582.

(G) From 21.3 g. (0.045 mole) of starting compound B and 45 ml. of butyllithium (0.09 mole) one obtains 14.6 g. (62.2%) of butylated end product; B.P. 175–177° C./0.02 mm.; $n_D^{20}$ 1.4710.

(H) 12.7 g. (0.0198 mole) of starting compound C and 19.8 ml. solution of butyllithium (0.0396 mole) are obtained 10.6 g. (78.2%) of butylated end product; B.P. 220° C./0.03 mm.; $n_D^{20}$ 1.4792.

(J) From 22.4 g. (0.0236 mole) of starting compound D and 23.6 ml. solution of butyllithium (0.0472 mole) one obtains 9.7 g. (78.2%) of butylated end product; B.P. 290–293° C./0.03 mm.; $n_D^{20}$ 1.4830.

(K) From 45.2 g. (0.15 mole) of starting compound A in 100 ml. of hexane, and 75 ml. solution of butyllithium (0.15 mole) one obtains 15.6 g. (32.2%) of half butylated end product; B.P. 90° C./0.5 mm.; $n_D^{20}$ 1.4612; and also some twice butylated end product F.

EXAMPLE 3

In the starting compounds obtained as described in Example 1, phenyl groups are substituted for the chlorine atoms, as described below.

The compounds are dissolved in 20 ml. of toluene and then added dropwise with stirring to the calculated quantity of a freshly prepared solution of phenylsodium in toluene. The working up is as in Example 2.

(L) From 24.1 g. (0.08 mole) of starting compound A and 0.16 mole of phenylsodium (from 18.0 g. of chlorobenzol and 7.4 g. of sodium in 140 ml. of toluene) one obtains 24.0 g. (78.5%) of phenylated end product; B.P. 145–146° C./0.03 mm.; $n_D^{20}$ 1.5343.

(M) From 19.0 g. (0.04 mole) of starting compound B and 0.08 mole of phenylsodium (from 9.0 g. of chlorobenzol and 3.7 g. of sodium in 70 ml. of toluol) are obtained 18.1 g. (81.3%) of phenylated end product. The compound crystallizes, on being stirred with some low boiling petroleum ether; B.P. 217° C./0.04 mm.; M.P. 75–76° C. (from petroleum ether); $n_D^{20}$ 1.5650.

(N) From 11.9 g. (0.0185 mole) of starting compound C and 0.037 mole of phenylsodium (from 4.2 g. of chlorobenzol and 1.7 g. of sodium in 30 ml. of toluol) one obtains 5.4 g. (40%) of phenylated end product; B.P. 265–272° C./0.06 mm.; $n_D^{20}$ 1.5160.

EXAMPLE 4

In the starting compounds obtained as described in Example 1, diethylamino groups are substituted for the chlorine atoms, as described below.

The compounds are dissolved in 100 ml. of hexane and then the calculated quantity of diethylamine dissolved in 200 ml. of hexane is added dropwise. The solution is refluxed for two hours and the chlorohydrate filtered off. After eliminating the solvent and possibly the excess amine, the residue, if possible, distilled. Residues which cannot be distilled are recrystallized.

(O) From 43.0 g. (0.143 mole) of starting compound A and 44.0 g. (0.6 mole) of diethylamine are obtained 40.5 g. (75.5%) of aminated end product; B.P. 110–114° C./0.02 mm.; $n_D^{20}$ 1.4632.

(P) From 34.1 g. (0.072 mole) of starting compound B and 21.0 g. (0.287 mole) of diethylamine one obtains 25.6 g. (65%) of aminated end product; B.P. 180° C./0.3 mm.; $n_D^{20}$ 1.4748.

(Q) From 33.6 g. (0.05 mole) of 1,3-bis-diphenylchlorosilyl-2,2-diphenyl-1,3,2-diazasilacyclopentane and 30 g. (large excess) of n-propylamine in 400 ml. of benzene are obtained 34.8 g. (97%) of aminated end product; M.P. 151° C. (from cyclohexane).

(R) From 20.8 g. (0.031 mole) of 1,3-bis-diphenylchlorosilyl-2,2-diphenyl-1,3,2-diazasilacyclopentane on introducing ammonia during two days in a boiling xylene solution (300 ml.). The aminated end product is recrystallized from cyclohexane by addition of charcoal; M.P. 160° C.

(S) From 34.6 g. (0.53 mole) of starting compound C and 16.0 g. (0.219 mole) of diethylamine one obtains 22.0 g. (58.2%) of aminated end product; B.P. 222–225° C./0.03 mm.; $n_D^{20}$ 1.4818.

(T) From 33.2 g. (0.405 mole) of starting compound D and 13.0 g. (0.178 mole) of diethylamine are obtained 20.3 g. (56%) of aminated end product; B.P. 270° C./0.04 min.

EXAMPLE 5

In the starting compounds obtained as described in Example 4, phenoxy groups or siloxy groups are substituted for the amino groups as described hereafter.

The compounds are heated with the calculated quantity of phenol or silanol in n-octane. The diethylamine which cleaves off during the reaction is lead through a condenser kept at 65° into a trap which contains a 1 n-HCl solution by means of a nitrogen current and then determined quantitatively. The end products are purified by distillation.

(U) From 18.7 g. (0.05 mole) of starting compound O and 10.8 g. (0.1 mole) of m-cresole in 20 ml. of n-octane one obtains 21.0 g. (94%) of aroxylated end product; B.P. 172° C./0.01 mm.; $n_D^{20}$ 1.5123.

(V) From 18.7 g. (0.05 mole) of starting compound O and 21.4 g. (0.1 mole) of methyldiphenylsilanol in 50 ml. of n-octane one obtains 27.4 g. (83.5%) of siloxylated end product; B.P. 226° C./0.02 mm.; $n_D^{20}$ 1.5420.

(W) From 37.3 g. (0.05 mole) of starting compound P and 21.4 g. (0.1 mole) of methyldiphenylsilanol in 100 ml. of n-octane one obtains 31.4 g. (75.8%) of siloxylated end product; B.P. 275° C./0.02 mm.; $n_D^{20}$ 1.5325.

EXAMPLE 6

In the starting compounds obtained as described in Example 1, siloxy groups are substituted for the chlorine atoms, as described below.

The compounds are refluxed with the calculated quantity of sodium silanolate in 80–100 ml. of benzene or xylene for 1–3 hours and the sodium chloride is filtered off. After elimination of the solvent the residue is, if possibly, distilled. Residues which cannot be distilled are recrystallized.

(X) From 19.9 g. (0.042 mole) of starting compound B and 9.4 g. (0.084 mole) of sodium trimethylsilanolate one obtains 19.3 g. (78%) of siloxylated end product; B.P. 153° C./0.02 mm.; $n_D^{20}$ 1.4505.

(Y) From 16.8 g. (0.026 mole) of starting compound C and 5.8 g. (0.052 mole) of sodium trimethylsilanolate one obtains 14.1 g. (72%) of siloxylated end product; B.P. 205–206° C./0.02 mm.; $n_D^{20}$ 1.4622.

(Z) From 46.3 g. mixture of the starting compounds D and E, containing 0.1293 mole of chlorine and 14.5 g. of sodium trimethylsilanolate one obtains 21.3 g. of siloxylated end product with $n=4$; B.P. 255° C./0.001 mm.; $n_D^{20}$ 1.4697; and 10.8 g. of siloxylated end product with $n=5$; B.P. 280–300° C./0.02 mm.

(AZ) From 7.5 g. (0.025 mole) of starting compound A in 100 ml. of xylene and 14.9 g. (0.05 mole) of sodium triphenylsilanolate one obtains 14.8 g. (76%) of siloxylated end product; M.P. 132–133° C.

What I claim is:
1. A process for preparing 1,3-disilyl-1,3,2-diazasilacycloalkanes of the general formula

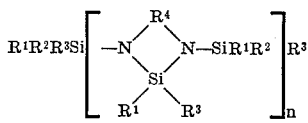

in which $R^1$, $R^2$ and $R^3$, when taken singly, represent identical or different hydrocarbon groups or silyl groups, which can also be attached through an oxygen atom and the silyl groups also through a nitrogen atom, $R^1$ and $R^2$ can also be hydrogen atoms or fluorine atoms, $R^3$ can also be an $NH_2$, $NHR'$ or $NR'_2$ group where $R'$ is a hydrocarbon group, $R^4$ is a bivalent hydrocarbon group, an ether group attached through a carbon atom or a corresponding group, which possesses S, SS, NH, NR″ (R″=hydrocarbon group occurring in such groups), $SiR^1R^2$, $NSiR^1R^2R^3$, SO or $SO_2$ in the place of the ether oxygen atom, which group $R^4$ has attached the two nitrogen atoms of the diazasilacycloalkane ring in 1,2- or 1,3-position, or ortho- or peri-position, and $n$ stands for an integer of 1 to 10, comprising reacting to compound of the general formula

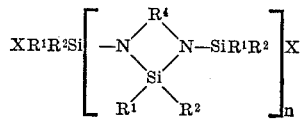

wherein X is a chlorine, bromine atom or an amino group and the other symbols have the meaning given above, with a compound of the formula $MR^3$ wherein $R^3$ is as defined above and M is an alkali metal atom, or M is a hydrogen atom provided $R^3$ is an amino group and X is in both cases a chlorine or bromine atom, or M is a hydrogen atom, provided $R^3$ is attached through an oxygen atom and X is an amino group.

2. A process of claim 1 wherein X is a chlorine or bromine atom, M is an alkali metal atom, $R^4$ is hydrocarbylene and $R^3$ is hydrocarbyl.

3. A process of claim 1 wherein X is a chlorine or bromine atom, M is a hydrogen atom, $R^4$ is hydrocarbylene and $R^3$ is an amino group.

4. The process of claim 1 wherein X is the residue of the secondary amine, M is a hydrogen atom, $R^4$ is hydrocarbylene and $R^3$ is a phenoxy or tri-hydrocarbylsiloxy group.

5. A process of claim 1 wherein X is a chlorine or bromine atom, M is an alkali metal atom, $R^4$ is hydrocarbylene and $R^3$ is trihydrocarbylsiloxy.

6. A compound of the formula

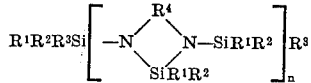

in which $R^1$, $R^2$ and $R^3$, when taken singly, represent identical or different, hydrocarbon groups, or silyl groups, which can also be attached through an oxygen atom and the silyl groups also through a nitrogen atom, $R^1$ and $R^2$ can also be hydrogen atoms or fluorine atoms, $R^3$ can also be an $NH_2$, $NHR'$ or $NR'R'$ group where $R'$ is a hydrocarbon group, $R^4$ is a bivalent hydrocarbon group, an ether group attached through a carbon atom or a corresponding group, which possess S, SS, NH, NR″ (R″= hydrocarbon group occurring in such groups), $SiR^1R^2$, $NSiR^1R^2R^3$, SO or $SO_2$ in place of the ether oxygen atom, which group $R^4$ has attached two nitrogen atoms of the diazasilacycloalkane ring in 1,2- or 1,3-, or ortho- or periposition and $n$ stands for an integer of 2 to 10.

7. A compound of claim 6 wherein $R^1$, $R^2$ and $R^3$ are hydrocarbyl and $R^4$ is hydrocarbylene.

8. A compound of claim 6 wherein $R^1$ and $R^2$ are hydrocarbyl, at least one of the $R^3$'s is secondary hydrocarbylamino and $R^4$ is hydrocarbylene.

9. A compound of claim 6 wherein $R^1$ and $R^2$ are hydrocarbyl, $R^3$ is hydrocarbyloxy and $R^4$ is hydrocarbylene.

10. A compound of claim 6 wherein $R^1$ and $R^2$ are hydrocarbyl, $R^3$ is trihydrocarbylsilyloxy and $R^4$ is hydrocarbylene.

References Cited

UNITED STATES PATENTS

| | | | |
|---|---|---|---|
| 3,098,830 | 7/1963 | Rochow | 260—448.2 XR |
| 3,146,250 | 8/1964 | Speier | 260—448.2 |
| 3,170,941 | 2/1965 | Speier | 260—448.2 |
| 3,297,592 | 1/1967 | Fink | 260—448.2 XR |

OTHER REFERENCES

Breed et al., "Journal of Polymer Science: Part A," vol. 2, pp. 45–55 (1964).

TOBIAS E. LEVOW, Primary Examiner

W. F. BELLAMY, Assistant Examiner

U.S. Cl. X.R.

252—74, 382, 399; 260—46.5

PO-1050
(5/69)

UNITED STATES PATENT OFFICE
CERTIFICATE OF CORRECTION

Patent No. 3,509,195              Dated April 28, 1970

Inventor(s) Walter Fink

It is certified that error appears in the above-identified patent and that said Letters Patent are hereby corrected as shown below:

Column 2, line 57 insert the word "the" between than and previously.

Column 2, line 68 the term "four-numbered" should read -----four-membered-----.

Column 3, line 33 the ratio "1:05" should read -----1:0.5-----.

Column 4, line 2 "diazasilane" should read -----diazasilazane-----.

Column 4, lines 40 and 41 "$R_1$ and $R_2$" should read ----$R^1$ and $R^2$----.

Column 4, line 52 the substituent "SCOR", should be preceeded by a bond ------ -SCOR--------.

Column 4, line 58 the R is followed by quotation symbols instead of double prime marks.

Column 4, line 62 "diphenylactyl" should read ----diphenylacetyl----.

Column 4, line 63 the word "naphthol" should read ---napthoyl----.

Column 4, line 66 "cynacetyl" should read ---cyanacetyl-----.

Column 5, line 12 "-$SO_2$=" should read ---- -$SO_2$- --------.

Column 5, line 29 "lauroxyloxy" should read ----lauroyloxy-----.

Column 5, line 26 "propionyloxy" should read ----propiolyloxy----.

Column 5, line 31 "-SCSR'" should read ---- -SCSR"------.

PO-1050
(5/69)

UNITED STATES PATENT OFFICE
CERTIFICATE OF CORRECTION

Patent No. 3,509,195  Dated April 28, 1970

Inventor(s) Walter Fink  PAGE - 2

It is certified that error appears in the above-identified patent and that said Letters Patent are hereby corrected as shown below:

Column 5, line 56 "(biphenyl)" should read ---(biphenylyl)---.

Column 5, line 71 "-SO$_2$=" and "-CO=" should read ----- -SO$_2$- ----- and ------ -CO- -----------.

Column 6, line 11 "ethqyidenamino" should read ----ethylidenamino------.

Column 6, line 65 "Cl, 1071" should read ---Cl, 10.71----.

Column 8, line 23 the word is should be inserted after "residue".

Column 8, line 72 "37.3" should read ----27.3------.

Column 9, line 37 the part of the formula in Claim 1 which reads

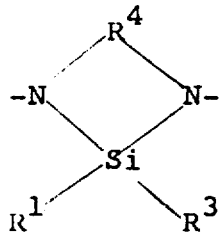    should read    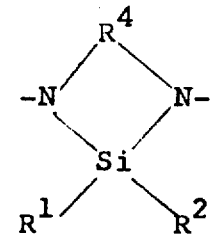

Signed and sealed this 13th day of June 1972.

(SEAL)
Attest:

EDWARD M. FLETCHER, JR.
Attesting Officer

ROBERT GOTTSCHALK
Commissioner of Patents